US006781964B1

(12) United States Patent
Klaghofer

(10) Patent No.: US 6,781,964 B1
(45) Date of Patent: Aug. 24, 2004

(54) METHOD FOR MAKING MULTIPOINT CONNECTIONS BETWEEN A PLURALITY OF TERMINAL EQUIPMENT OF AN H.323 DATA COMMUNICATION NETWORK

(75) Inventor: Karl Klaghofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/467,954

(22) Filed: Dec. 21, 1999

(30) Foreign Application Priority Data

Dec. 21, 1998 (DE) .......................................... 198 59 163

(51) Int. Cl.⁷ ............................................... H04L 12/16
(52) U.S. Cl. ....................... 370/261; 370/270; 370/352; 370/398; 370/422; 379/202.01; 348/14.08
(58) Field of Search ................................. 370/260–267, 370/270, 352, 398, 422; 379/202.01, 203.01, 204.01, 205.01; 348/14.08, 14.09

(56) References Cited

U.S. PATENT DOCUMENTS

| | | | | |
|---|---|---|---|---|
| 5,867,653 A | * | 2/1999 | Aras et al. ................... | 709/204 |
| 5,963,547 A | * | 10/1999 | O'Neil et al. ................ | 370/260 |
| 6,018,360 A | * | 1/2000 | Stewart et al. ............ | 348/14.09 |
| 6,163,531 A | * | 12/2000 | Kumar ........................ | 370/260 |
| 6,339,842 B1 | * | 1/2002 | Fernandez et al. .......... | 725/133 |
| 6,424,994 B1 | * | 7/2002 | Pirich et al. ................ | 709/205 |

OTHER PUBLICATIONS

Kyung Hee Lee et al., "An Implementation of Codntrol Protocol for Multipoint Audio–Video Teleconferencing Systems", Proceedings Twelfth International Conference on Information Networking ICOIN–12, (1998), pp. 38–41.

G.A. Thom, "H. 323: The Multimedia Communications Standard for Local Area Networks", IEEE Communications Magazine, (1996) pp. 52–56.

S. Okubo et al., "ITU–T Standardization of Audiovisual Communication Systems in ATM and LAN Environments", IEEE Journal on Selected Areas in Communications, (1997) pp. 965–982.

ITU–T H.323 (2/98) Series H: Audiovisual and Multimedia Systems.

* cited by examiner

Primary Examiner—Dang Ton
Assistant Examiner—Inder Palmehra
(74) Attorney, Agent, or Firm—Bell, Boyd & Lloyd LLC

(57) ABSTRACT

A method for realizing multipoint connections in a H.323 data communication network composed of a connection between first terminal equipment and second terminal equipment and of a consultation connection between the first terminal equipment and third terminal equipment. The multipoint connection setup is respectively initiated by the first terminal equipment with a connection setup to a conference unit. After the setup of signaling connections between the participating terminal equipment and the conference unit, and after releasing the connections between the terminal equipment, the conference unit initiates the opening of payload data channels between the terminal equipment via the conference unit. The setup of signaling connections between the participating terminal equipment and the conference unit is controlled in a call redirection initiated by the first terminal equipment and implemented in the other terminal equipment having the call redirection destination of conference unit.

2 Claims, 2 Drawing Sheets

METHOD FOR MAKING MULTIPOINT CONNECTIONS BETWEEN A PLURALITY OF TERMINAL EQUIPMENT OF AN H.323 DATA COMMUNICATION NETWORK

BACKGROUND OF THE INVENTION

1. Field of the Invention

The present invention is directed to a method for making multipoint connections between a plurality of terminal equipment of a data communication network according to the Standard ITU-T H.323, wherein logical channels for payload data transmission are opened up between first terminal equipment and second terminal equipment, and logical channels for payload data transmission of a consultation connection are opened up between the first terminal equipment and third terminal equipment.

2. Description of the Prior Art

Multipoint connections between a plurality of subscribers of a communication network are known as conference circuits that are controlled by a central conference circuit controller which is also provided in the communication network. For example, multipoint control units MCU contained in a communication network may be used. Given a multipoint connection upon employment of such multipoint control units, terminal devices have a respective point-to-point connection to the multipoint control unit. This multipoint control unit implements a multipoint function that also is referred to as multipoint processing. In this multipoint processing, the data streams of the individual point-to-point connections are handled such that the data streams coming from individual terminal equipment are mixed together and the respectively produced mixture is transmitted to the corresponding terminal devices. Such a procedure is described, for example, in the Standard ITU-T H.323, Clause 6.8.1 under the designation "Centralized Conference."

Before a centrally controlled conference according to ITU-T H.323, 6.8.1 is initiated, all subscribers of the conference are informed of the point in time of the conference beginning. To this end, all subscribers of the conference are provided with a specific MCU address as well as the point in time at which each of the subscribers should initiate the setup of a point-to-point connection upon employment of this MCU address. As an alternative, the MCU can initiate a point-to-point connection to each of these subscribers at the communicated point in time.

A multipoint communication with decentralized control is also known wherein a multipoint control is only provided for processing a multipoint signaling. Such decentralized multipoint control can, for example, be effected in terminal equipment or in a multipoint control unit. Given such a multipoint communication, each of the participating terminal equipment sends the payload information to a multicast address prescribed by the multipoint control wherein the multipoint control assigns a plurality of different multicast addresses and informs each terminal equipment of a multicast address for its information to be transmitted. Each terminal equipment thus both transmits to a specific multicast address and receives the information sent to the other multicast addresses assigned by the multipoint control. To this end, all participating terminal equipment must support multicast functions. Alternatively to the employment of multicast, multi-unicast can be provided. In this method, the terminal equipment send the data streams to be transmitted to the other terminal equipment respectively participating in the multipoint connection upon employment of multiple point-to-point connections.

Such a procedure is described, for example, in the Standard ITU-T H.323, Clause 6.8.2, under the title "Decentralized Conference." The following conditions must be met in order to establish a multipoint communication with decentralized control according to this standard proceeding from an existing call between first subscriber A and a second subscriber B:

at least one of the subscribers A and B must have a terminal equipment with multipoint control or a gate keeper that is available must have a multipoint control;

all participating terminal equipment must support multicast functionality or multi-unicast functionality.

A gate keeper is a logical function for satisfying standard functions such as address resolution or broadband administration. Address resolution means that a calling terminal point sends an alias address of a terminal point to be called to the gate keeper and receives the transport address (i.e., the Internet protocol address and the port number), from the gate keeper. The gate keeper knows the traffic volume with respect to real-time applications within the network area for which it is responsible.

Over and above this, the subscriber A or, respectively, B that initiates a consultation call to a further subscriber C during the existence of a call between the subscribers A and B must typically define, upon setup of this consultation call, subscribers A and B with a multipoint connection.

The above-described examples for setting up a centrally controlled or decentrally controlled multipoint connection setup do not, however, enable a flexible setup of a three-party conference proceeding from a two-subscriber call with consultation call.

An object of the present invention, therefore, is to specify a method for making multipoint connections between a plurality of terminal equipment of a data communication network according to the Standard ITU-T H.323 for that case wherein logical channels for payload data transmission are opened up between a first terminal equipment and a second terminal equipment, and logical channels for payload data transmission of a consultation connection are opened up between this first terminal equipment and third terminal equipment.

SUMMARY OF THE INVENTION

Accordingly, pursuant to an embodiment of the method of the present invention, such method includes the steps of: communicating a connection setup message, including a request for establishing a multipoint connection from the first terminal equipment, to a conference unit provided in the data communication network; communicating an acknowledgment message, including an identifier of a prepared multipoint connection from the conference unit, to the first terminal equipment; communicating a performance feature message for call redirection from the first terminal equipment respectively to the second and to the third terminal equipment with the call redirection destination conference unit while indicating the identifier of the prepared multipoint connection; communicating a connection setup message upon specification of the identifier of the prepared multipoint connection respectively from the second terminal equipment and third terminal equipment to the conference unit; communicating a respective acknowledgment message in response to the connection setup message to the second terminal equipment and third terminal equipment as reaction thereto; clearing down the connections existing between the terminal equipment by the second and third terminal equipment; and communicating a performance feature message respectively from the conference unit to all terminal equipment participating in the multipoint connection in order to initiate the opening of logical channels for payload data transmission between this terminal equipment via the conference unit.

A precondition for implementing this first version of the inventive method is that terminal equipment initiating a multipoint connection must maintain point-to-point connections to all other terminal equipment provided for the multipoint connection. The one terminal equipment initiates the other terminal equipment to respectively setup a connection to the conference unit and, after setup of a signaling connection to the conference unit, respectively initiates the clear down of the existing point-to-point connection to the first terminal equipment. The one terminal equipment thereby informs the other terminal equipment of a call identifier previously communicated from the conference unit.

This call identifier can, for example, be an address of the conference unit allocated to this call by the conference unit; the conference unit being indicated as call redirection destination for the other terminal equipment. The call redirection destination, however, also can be an address of the conference unit that is not permanently allocated to the call. In this case, a call identifier allocated to the multipoint connection to be setup by the conference unit is additionally communicated to the terminal equipment and is communicated to the conference unit from this given connection setup.

After a signaling connection has been respectively setup between the conference unit and the individual terminal equipment participating in the multipoint connection, and the previously existing connections between the individual terminal equipment have been cleared down, logical channels are opened up between all terminal equipment via the conference unit for payload data transmission. To this end, the conference unit communicates a performance feature message to each of the terminal equipment. A mixer for mixing the data streams coming from the individual terminal equipment is contained, for example, in the conference unit. Such a mixer preferably makes a mixture of the useful data streams coming from the other terminal equipment available to one terminal equipment.

Pursuant to a second embodiment of the method of the present invention, the aforementioned object is achieved via the following steps: communicating a connection setup message, including a request for establishing a multipoint connection upon specification of addresses of the terminal equipment to participate in this multipoint connection from the first terminal equipment, to a conference unit provided in the data communication network; communicating an acknowledgment message from the conference unit to the first terminal equipment; communicating a respective connection setup message for a multipoint connection from the conference unit to the second and third terminal equipment; communicating a performance feature message for reporting the successful signaling connection setup to all terminal equipment participating in the multipoint connection from the conference unit to the first terminal equipment; clearing down the existing connections between the first terminal equipment and the second terminal equipment as well as between the first terminal equipment and the third terminal equipment, initiated by messages output by the first terminal equipment; and communicating a performance feature message from the conference unit to all terminal equipment to participate in the multipoint connection in order to initiate the opening of logical channels for payload data transmission between the terminal equipment via the conference unit.

A pre-condition for implementing this second embodiment of the method of the inventive method is, likewise, that terminal equipment initiating a multipoint connection maintains point-to-point connections to all other terminal equipment provided for the multipoint connection. The one terminal equipment initiates the conference unit to respectively setup a connection to the other terminal equipment. After setting up a signaling connection from the conference unit to all terminal equipment provided for the multipoint connection, the conference unit initiates the one terminal equipment to clear down the connections existing between this terminal equipment and the other terminal equipment.

After a respective signaling connection has been setup between the conference unit and the individual terminal equipment to participate in the multipoint connection, and after the previously existing connections between individual terminal equipment have been cleared down, logical channels for payload data transmission between all terminal equipment are opened up via the conference unit. To this end, the conference unit communicates a corresponding performance feature message to each of the terminal equipment. A mixer for mixing the data streams coming from the individual terminal equipment is contained, for example, in the conference unit. Such a mixer preferably makes a mixture of the payload data streams coming from the other terminal equipment available to one terminal equipment.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
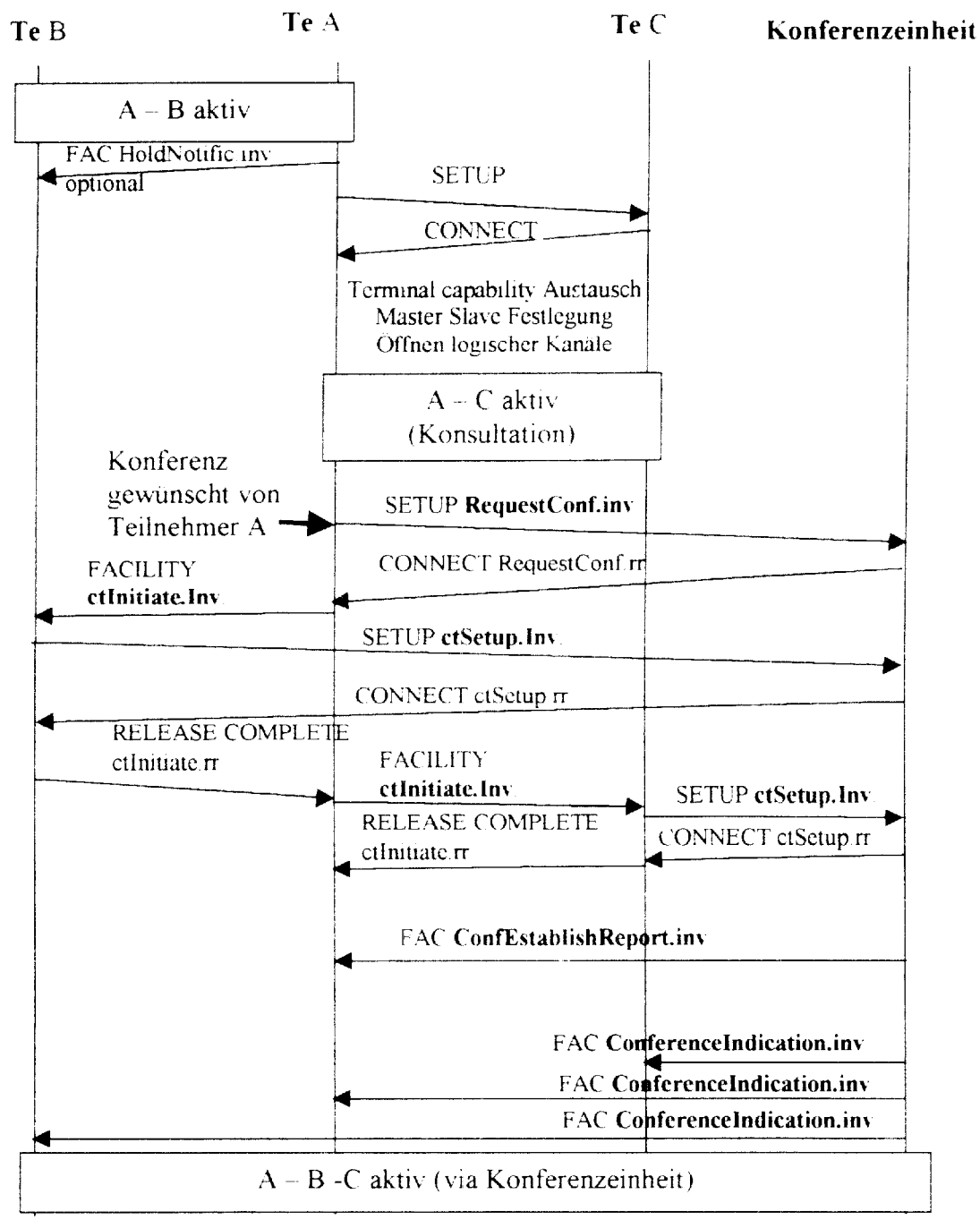
FIG. 1 shows a message flowchart for making a multipoint connection in a communication network according to the Standard ITU-T H.323 as a first exemplary embodiment of the inventive method.
Figure 2:
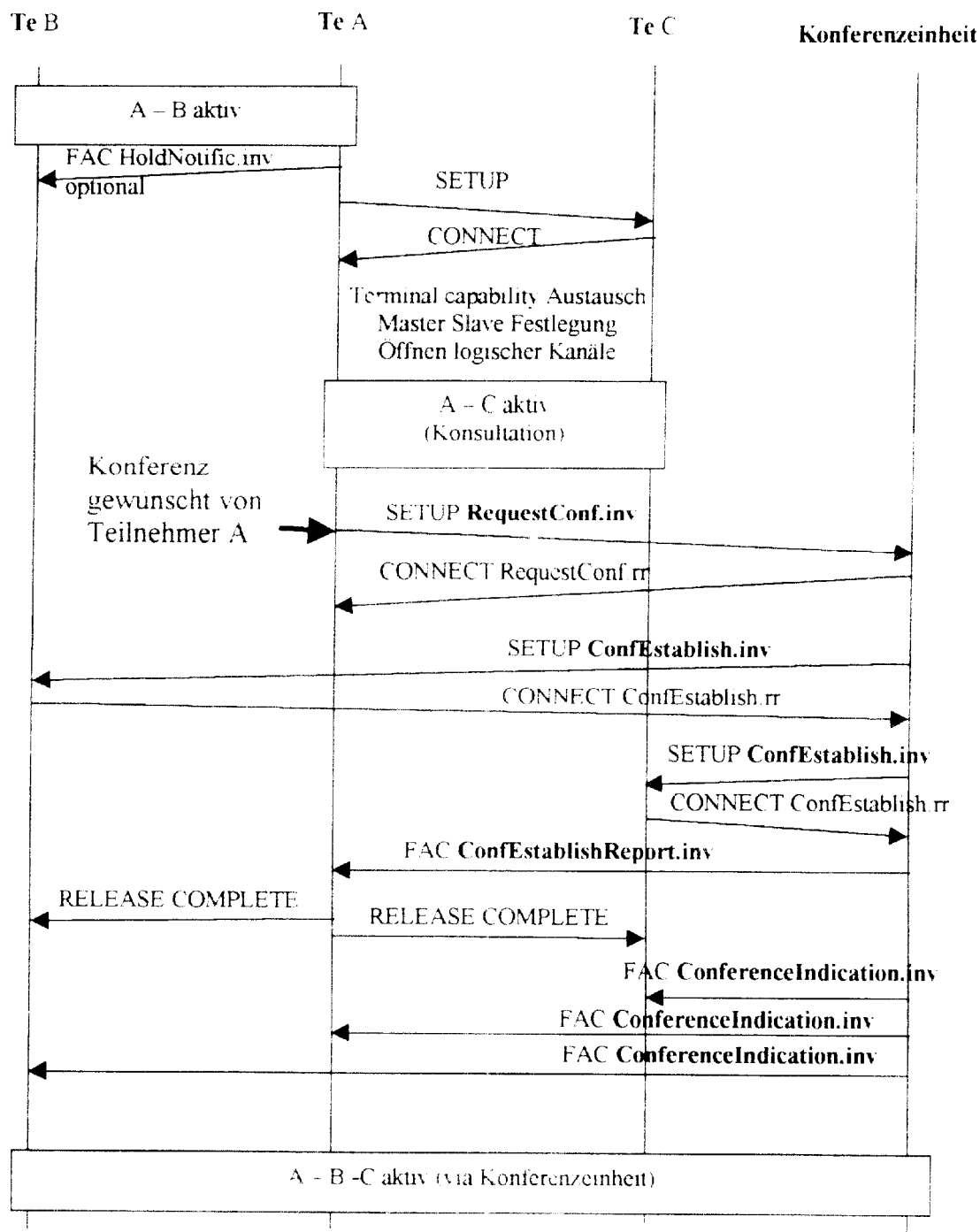
FIG. 2 shows a message flowchart for making a multipoint connection in a communication network according to the Standard ITU-T H.323 as a second exemplary embodiment of the inventive method.

FIGS. 1 and 2 respectively show basic conditions, events and the message flow between three terminal equipment TeA, TeB and TeC of a communication network, according to the Standard ITU-T H.323, and a conference unit provided in the communication network. The terminal equipment TeA, TeB and TeC, the communication network and the conference unit are not physically shown in FIGS. 1 and 2. The terminal equipment TeA, TeB and TeC and the conference unit, however, have a vertical line respectively allocated to them. The conference unit was thereby referred to as such in FIGS. 1 and 2 for purposes of easier comprehension.

In the initial condition, both a connection with signaling connections and opened, logical channels for payload data transmission exist between first terminal equipment TeA and second terminal equipment TeB in both exemplary embodiments shown in FIGS. 1 and 2. This is illustrated by a status block A-B active between the terminal equipment TeA and the second terminal equipment TeB. The first terminal equipment TeA initiates a hold of the connection between the first and the second terminal equipment TeA, TeB with a performance feature message FAC HoldNotific.inv. This procedure is not necessarily required and is, therefore, respectively identified as "optional" in FIGS. 1 and 2. The determination of the master-slave role distribution and the opening of logical channels of a consultation connection are established between the first terminal equipment TeA and third terminal equipment TeC with a connection set up message SETUP from the first terminal equipment TeA to the second terminal equipment TeB, and an acknowledgment message CONNECT from the third terminal equipment TeC to the first terminal equipment TeA as well as by the exchange of terminal capability messages for communicating the possibilities of the respective connection partner. This is shown in FIGS. 1 and 2 by a status block A-C active (consultation) between the first terminal equipment TeA and the third terminal equipment TeC.

In the executive sequences for making a multipoint connection shown in either FIG. 1 or 2, a subscriber A at the first terminal equipment TeA initiates such a multipoint connection by communicating a connection setup message SETUP RequestConf.inv including an inquiry for setting up a multipoint connection to a conference unit provided in the data communication network. In both illustrated exemplary embodiments, the conference unit communicates an acknowledgment message CONNECT RequestConf.rr. A signaling connection is setup between the first terminal equipment TeA and the conference unit on the basis of this acknowledgment message CONNECT RequestConf.rr.

In the exemplary embodiment shown in FIG. 1, this communicated acknowledgment message CONNECT RequestConf.rr must contain an identifier of a prepared multipoint connection. In response to the acknowledgment message CONNECT RequestConf.rr, the first terminal equipment TeA respectively communicates a performance feature message FACILITY ctInitiate.Inv to both the second and third terminal equipment TeB, TeC with the call redirection destination of the conference unit upon indication of the identifier of the prepared multipoint connection.

A connection setup message SETUP ctSetup.Inv upon indication of the identifier of the prepared multipoint connection is respectively communicated to the conference unit from both the second terminal equipment TeB and the third terminal equipment TeC. This connection setup message SETUP ctSetup.Inv—as seen from the point of view of the second terminal equipment TeB or respectively, of the third terminal equipment TeC—serves to initiate a call redirection from the first terminal equipment TeA to the conference unit.

In response to the connection setup message SETUP ctSetup.Inv, the conference unit respectively communicates an acknowledgment message CONNECT ctSetup.rr to the second terminal equipment TeB and to the third terminal equipment TeC. As a reaction thereto, the second and third terminal equipment TeB, TeC respectively initiate the clear down of the connections existing between the terminal equipment TeA, TeB, TeC on the basis of a release message RELEASE COMPLETE ctinitiate.rr.

The conference unit respectively communicates a performance feature message FAC ConferenceIndication.Inv to all terminal equipment TeA, TeB, TeC participating in the multipoint connection in order to open up logical channels for payload data transmission between the terminal equipment TeA, TeB, TeC via the conference unit. As a result, FIG. 1 shows a status block between the terminal equipment TeA, TeB and TeC as well as the conference unit having the designation A-B-C active (via conference unit).

In the exemplary embodiment shown in FIG. 2, in contrast to that shown in FIG. 1, the acknowledgment message CONNECT RequestConf.rr communicated from the conference unit to the first terminal equipment TeA need not necessarily contain an identifier of a prepared multipoint connection. In this exemplary embodiment of the second inventive method shown in FIG. 2, moreover, the first terminal equipment TeA and, as a consequence thereof, the other terminal equipment TeB and TeC are not initiated by the acknowledgment message CONNECT RequestConf.rr to undertake the control of the signaling connection setup of the multipoint connection.

Instead, the connection setup message SETUP RequestConf.Inv communicated from the first terminal equipment TeA to the conference unit provided in the data communication network with the request for establishing a multipoint connection must contain addresses of the terminal equipment TeA, TeB, TeC participating in the multipoint connection. In addition to communicating an acknowledgment message CONNECT RequestConf.rr to the first terminal equipment TeA, the conference unit respectively communicates a connection setup message SETUP ConfEstablish.Inv for a multipoint connection to the second and third terminal equipment TeB, TeC.

In response thereto, the second and third terminal equipment TeB, TeC acknowledge these connection setup messages with a respective acknowledgment message CONNECT ConfEstablish.rr to the conference unit. As a result of the acknowledgment messages CONNECT RequestConf.rr from the conference unit to the first terminal equipment TeA and CONNECT ConfEstablish.rr from the second and third terminal equipment TeB, TeC to the conference unit, a signaling connection is established between the conference unit and each of the terminal equipment TeA, TeB and TeC participating in the multipoint connection.

In order to achieve this, the conference unit reports to the first terminal equipment TeA with a performance feature message FAC ConfEstablishReport.Inv. The performance feature message FAC ConfEstablishReport.Inv initiates the first terminal equipment TeA to release the existing connections between the first terminal equipment TeA and the second terminal equipment TeB as well as between the first terminal equipment TeA and the third terminal equipment TeC with the assistance of messages RELEASE COMPLETE to the second and third terminal equipment TeB [sic] and TeC.

The conference unit communicates a respective performance figure message FAC ConferenceIndication.inv to all terminal equipment TeA, TeB, TeC to participate in the multipoint connection in order to initiate the opening of logical channels for payload data transmission between these terminal equipment TeA, TeB, TeC via the conference unit. As a result, FIG. 2 shows a status block between the terminal equipment TeA, TeB and TeC as well as the conference unit having the designation A-B-C active (via conference unit).

For effecting the methods according to either FIG. 1 or 2, only the first terminal equipment initiating the multipoint connection need have a specific controller. The other terminal equipment can be known standard terminal equipment of a data communication network according to the Standard ITU-T H.323.

Although the present invention has been described with reference to specific embodiments, those of skill in the art will recognize that changes may be made thereto without departing from the spirit and scope of the invention as set forth in the hereafter appended claims.

I claim:

1. A method for making multipoint connections between a plurality of terminal equipment of a data communication network according to the Standard ITU-TH.323, wherein logical channels for payload data transmissions are opened up between first terminal equipment and second terminal equipment and the logical channels for payload data transmission of a consultation call are opened up between the first terminal equipment and third terminal equipment, the method comprising the steps of:

communicating a connection set up message, including a request to setup a multipoint connection, from the first terminal equipment, to a conference unit provided in the data communication network;

communicating an acknowledgment message, including an identifier of a prepared multipoint connection, from the conference unit to the first terminal equipment;

communicating a performance feature message for call redirection, from the first terminal equipment to both the second and third terminal equipment, with a call redirection destination of the conference unit, upon communication of the identifier from the first terminal equipment to both the second and third terminal equipment;

communicating a connection setup message upon specification of the identifier of the prepared multipoint connection from, respectively, the second and third terminal equipment to the conference unit;

communicating a respective acknowledgment message in response to the connection setup message from the conference unit to both the second and third terminal equipment;

releasing connections existing between the first, second and third terminal equipment by the second and third terminal equipment; and communicating a performance feature message respectively from the conference unit to the first, second and third terminal equipment to participate in the multipoint connection in order to initiate the opening of logical channels for payload data transmission between the first, second and third terminal equipment via the conference unit.

2. A method for making multipoint connections between a plurality of terminal equipment of a data communication network according to the Standard ITU-TH.23, wherein logical channels for payload data transmission are opened up between first terminal equipment and second terminal equipment and the logical channels for payload data transmission of a consultation call are opened up between the first terminal equipment and third terminal equipment, the method comprising the steps of:

communicating a connection set up message, including a request to setup a multipoint connection upon specification of addresses of the first, second and third terminal equipment to participate in the multipoint connection, from the first terminal equipment to a conference unit provided in the data communication network;

communicating an acknowledgment message from the conference unit to the first terminal equipment;

communicating a respective connection setup message for the multipoint connection from the conference unit to the second and third terminal equipment;

communicating a performance feature message, for reporting successful signaling connection setup to the first, second and third terminal equipment to participate in the multipoint connection, from the conference unit to the first terminal equipment;

releasing existing connections between the first terminal equipment and the second terminal equipment as well as between the first terminal equipment and the third terminal equipment, initiated by messages output from the first terminal equipment to both the second and third terminal equipment; and communicating a performance feature message respectively from the conference unit to the first, second and third terminal equipment to participate in the multipoint connection in order to initiate the opening of logical channels for payload data transmission between the first, second and third terminal equipment via the conference unit.

* * * * *